W. DE PUY.
Improvement in Fly-Traps.
No. 131,813.             Patented Oct. 1, 1872.
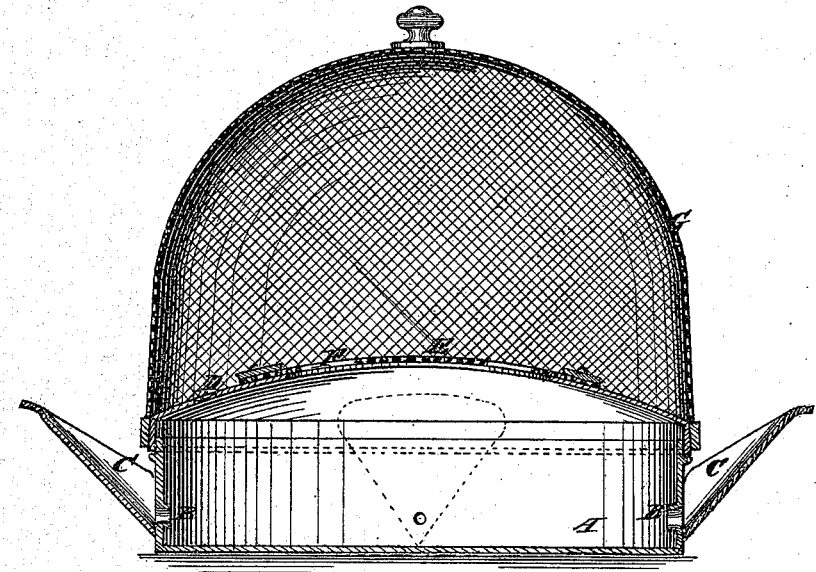
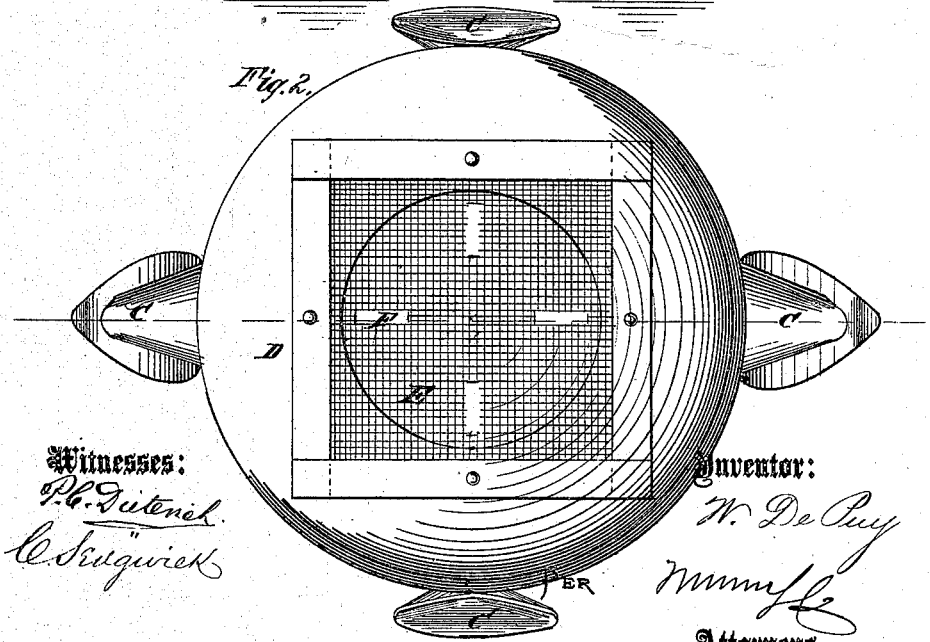

UNITED STATES PATENT OFFICE.

WILLIAM DE PUY, OF POLK STATION, PENNSYLVANIA.

IMPROVEMENT IN FLY-TRAPS.

Specification forming part of Letters Patent No. 131,813, dated October 1, 1872.

*To all whom it may concern:*

Be it known that I, WILLIAM DE PUY, of Polk Station, in the county of Venango and State of Pennsylvania, have invented a new and Improved Fly-Trap, of which the following is a specification:

My invention consists of a shallow pan or other vessel, preferably round, in which the bait is to be placed for attracting the flies, which said pan has several entrance-holes through the side a little above the bottom, so as to make it more difficult for the flies to find the way out than if placed at the bottom. Ear-shaped pieces are attached to the outside of the vessel converging at the entrance-holes to guide the flies to the holes. An oval cover, partly made of wire-gauze with several large holes to allow the flies to escape through it, is fitted on the pan, and over this cover is a dome of wire-gauze, affording a large light space into which the flies will naturally find their way from below after feeding, and from which they cannot escape.

Figure 1 is a transverse sectional elevation of my improved fly-trap, and Fig. 2 is a plan or top view with the reticulated dome removed.

Similar letters of reference indicate corresponding parts.

A represents the feeding-pan, which will preferably be made of tin, and in circular form, but it may be of other substance and shape. It is provided with a number of small holes, B, through the side, a little above the bottom, suitable for the flies to enter the pan by. The walls surrounding the holes project inward a little beyond the inner surface of the side wall of the pan to obstruct the escape of the flies, which is also rendered more difficult by the elevation of the holes above the bottom, because the flies being mostly on the bottom will not so readily find the holes. C represents the ear-shaped pieces attached to the outside of the pan, one to each hole. Said ears ascend obliquely from the holes, and have a large concave upper surface converging at the holes in a manner well calculated to guide the flies to them from which they get the odor of the food contained in the pan. D represents the oval cover of the pan, made partly of wire-gauze E, to admit light to the pan below, and provided with numerous oblong holes F, suitable to allow the flies to pass up through it. G represents the dome-shaped cover of wire-gauze, shaped to inclose a large space above the cover, in which the flies can be retained as they collect therein until destroyed.

I propose, in practice, to adapt the pan and cover D E in size and shape to allow of using the wire-gauze dish-covers of commerce for the domes, so that in the manufacture of the traps the labor and machinery required for making them will be avoided.

This contrivance will, it is believed, constitute a very efficient and desirable trap.

Having thus described my invention, I claim as new and desire to secure by Letters Patent—

The combination of the pan A with projections B in the side, the ears C, cover D E, and the wire-gauze dome G, all substantially as specified.

WM. DE PUY.

Witnesses:
 ORRIN BABCOCK,
 SAMUEL BUNNELL.